United States Patent
Cho et al.

(10) Patent No.: US 9,951,250 B2
(45) Date of Patent: *Apr. 24, 2018

(54) POLYIMIDE FILM AND DISPLAY DEVICE INCLUDING THE FILM

(71) Applicant: SAMSUNG ELECTRONICS CO., LTD., Suwon-si, Gyeonggi-do (KR)

(72) Inventors: Chung Kun Cho, Suwon-si (KR); Mikhail Kovalev, Suwon-si (KR); Fedosya Kalinina, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 441 days.

This patent is subject to a terminal disclaimer.

(21) Appl. No.: 14/516,926

(22) Filed: Oct. 17, 2014

(65) Prior Publication Data

US 2015/0225607 A1   Aug. 13, 2015

(30) Foreign Application Priority Data

Feb. 10, 2014  (KR) .................. 10-2014-0014921

(51) Int. Cl.
C09D 179/08 (2006.01)
C08G 73/14 (2006.01)

(52) U.S. Cl.
CPC ........... *C09D 179/08* (2013.01); *C08G 73/14* (2013.01); *Y10T 428/2495* (2015.01); *Y10T 428/31663* (2015.04)

(58) Field of Classification Search
None
See application file for complete search history.

(56) References Cited

U.S. PATENT DOCUMENTS

| | | | |
|---|---|---|---|
| 6,831,148 B2 | 12/2004 | Buchecker et al. | |
| 8,399,593 B2 | 3/2013 | Jung et al. | |
| 8,419,918 B2 | 4/2013 | Hong et al. | |
| 8,586,689 B2 | 11/2013 | Jung et al. | |
| 9,334,370 B2* | 5/2016 | Cho | C08K 3/22 |
| 2012/0183730 A1 | 7/2012 | Nakayama et al. | |

FOREIGN PATENT DOCUMENTS

| | | |
|---|---|---|
| JP | 2005146180 A | 6/2005 |
| JP | 2012150284 A | 8/2012 |
| KR | 1020010073503 A | 8/2001 |
| KR | 1020020069019 A | 8/2002 |
| KR | 1020060060083 A | 6/2006 |
| KR | 100629360 B1 | 9/2006 |
| KR | 1020110047859 A | 5/2011 |
| KR | 1020120083798 A | 7/2012 |
| KR | 1020130031052 A | 3/2013 |

* cited by examiner

*Primary Examiner* — Alicia L Otton
*Assistant Examiner* — Po-Chih Chen
(74) *Attorney, Agent, or Firm* — Cantor Colburn LLP

(57) ABSTRACT

A composite film including a base film including a polyimide or poly(imide-amide) copolymer and a coating layer including a copolymer represented by Chemical Formula 1 disposed on one surface of the base film:

Chemical Formula 1

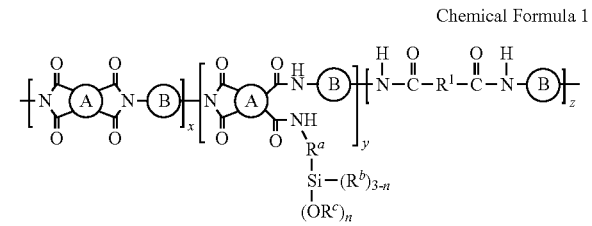

wherein, in the Chemical Formula 1, each substituent and variable is the same as described in the detailed description.

20 Claims, 5 Drawing Sheets

POLYIMIDE FILM AND DISPLAY DEVICE INCLUDING THE FILM

CROSS-REFERENCE TO RELATED APPLICATIONS

This application claims priority to Korean Patent Application No. 10-2014-0014921 filed on Feb. 10, 2014, and all the benefits accruing therefrom under 35 U.S.C. §119, the content of which is incorporated herein in its entirety by reference.

BACKGROUND

1. Field

This disclosure relates to a polyimide or poly(imide-amide) composite film, and a display device including the composite film.

2. Description of the Related Art

A polyimide or poly(imide-amide) copolymer has high thermal stability and excellent workability, and also excellent optical properties and thus has been researched for various applications such as optical lens, a functional optical film, a disk substrate, and the like. However, a film formed of the polyimide or poly(imide-amide) copolymer lacks solvent resistance in that it can be easily dissolved in an organic solvent.

Since a substrate for a display needs to be washed and etched, the solvent resistance of the film formed of the polyimide or poly(imide-amide) copolymer needs to be improved.

SUMMARY

An embodiment provides a polyimide or poly(imide-amide) composite film having improved transparency, heat resistance, mechanical strength, flexibility, and chemical resistance.

Another embodiment provides a display device including the polyimide or poly(imide-amide) composite film.

An embodiment provides a composite film that includes
a base film including a polyimide or poly(imide-amide) copolymer and
a coating layer including a copolymer represented by Chemical Formula 1 disposed on one surface of the base film.

In the Chemical Formula 1,

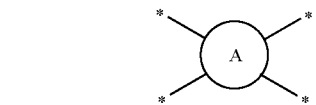

is the same or different in each repeating unit, and is independently represented by Chemical Formula 4.

Chemical Formula 4

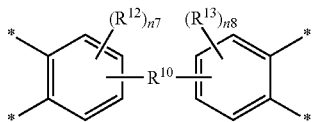

In the Chemical Formula 4, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxy group, an alkoxy group of formula $—OR^{208}$, wherein $R^{208}$ is a C1 to C10 aliphatic organic group, a silyl group of formula $—SiR^{209}R^{210}R^{211}$, wherein $R^{209}$, $R^{210}$, and $R^{211}$ are the same or different and are independently hydrogen, or a C1 to C10 aliphatic organic group, a substituted or unsubstituted C1 to C10 aliphatic organic group, or a C6 to C20 aromatic organic group, and n7 and n8 are independently integers ranging from 0 to 3.

In the above Chemical Formula 1, the

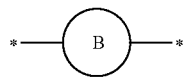

is the same or different in each repeating unit and is independently represented by Chemical Formula 5, 6, or 7.

Chemical Formula 1

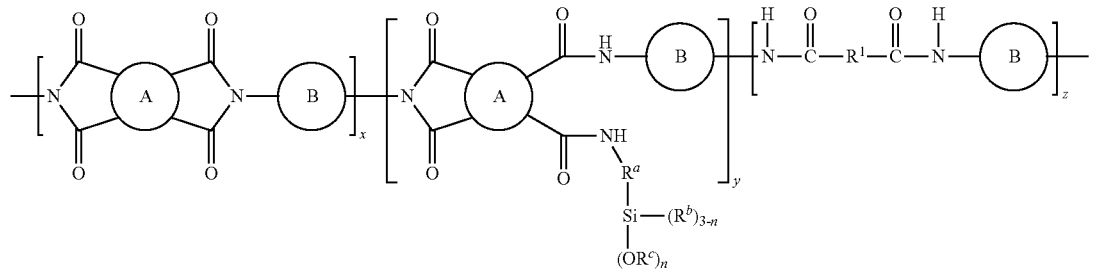

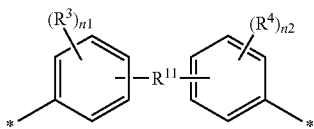

Chemical Formula 5

In the Chemical Formula 5, $R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and are independently a halogen, a hydroxy group, an alkoxy group of formula —$OR^{200}$, wherein $R^{200}$ is a C1 to C10 aliphatic organic group, a silyl group of formula —$SiR^{201}R^{202}R^{203}$, wherein $R^{201}$, $R^{202}$, and $R^{203}$ are the same or different and are independently hydrogen, or a C1 to C10 aliphatic organic group, a substituted or unsubstituted C1 to C10 aliphatic organic group, or a C6 to C20 aromatic organic group, and n1 and n2 are independently integers ranging from 0 to 4.

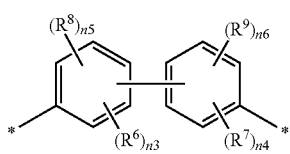

Chemical Formula 6

In the Chemical Formula 6, $R^6$ and $R^7$ are the same or different and are independently an electron withdrawing group, $R^8$ and $R^9$ are the same or different and are independently a halogen, a hydroxy group, an alkoxy group of formula —$OR^{204}$, wherein $R^{204}$ is a C1 to C10 aliphatic organic group, a silyl group of formula —$SiR^{205}R^{206}R^{207}$ wherein $R^{205}$, $R^{206}$, and $R^{207}$ are the same or different and are independently hydrogen, or a C1 to C10 aliphatic organic group, a substituted or unsubstituted C1 to C10 aliphatic organic group, or a C6 to C20 aromatic organic group, n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3, and
provided that n4+n6 is an integer ranging from 1 to 4.

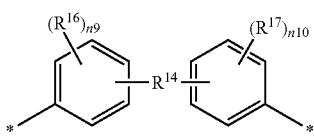

Chemical Formula 7

In the Chemical Formula 7, $R^{14}$ is O, S, C(=O), CH(OH), S(=O)$_2$, Si(CH$_3$)$_2$, (CH$_2$)$_p$, wherein 1≤p≤10, (CF$_2$)$_q$, wherein 1≤p≤10), C(CH$_3$)$_2$, C(CF$_3$)$_2$, C(=O)NH, or a substituted or unsubstituted C6 to C30 aromatic organic group, wherein the aromatic organic group includes one aromatic ring; 2 or more aromatic rings linked together to provide a condensed ring; or 2 or more aromatic rings linked together through a single bond, a fluorenylene group, O, S, C(=O), CH(OH), S(=O)$_2$, Si(CH$_3$)$_2$, (CH$_2$)$_p$, wherein 1≤p≤10, (CF$_2$)$_q$, wherein 1≤p≤10, C(CH$_3$)$_2$, C(CF$_3$)$_2$, or C(=O)NH, $R^{16}$ and $R^{17}$ are the same or different and are independently a halogen, a hydroxy group, an alkoxy group of formula —$OR^{212}$, wherein $R^{212}$ is a C1 to C10 aliphatic organic group, a silyl group of formula —$SiR^{213}R^{214}R^{215}$, wherein $R^{213}$, $R^{214}$, and $R^{215}$ are the same or different or are independently hydrogen, or a C1 to C10 aliphatic organic group, a substituted or unsubstituted C1 to C10 aliphatic organic group, or a C6 to C20 aromatic organic group, and n9 and n10 are independently integers ranging from 0 to 4.

In the Chemical Formula 1, $R^1$ may be the same or different in each repeating unit, and is independently a substituted or unsubstituted C6 to C30 aromatic organic group.

$R^a$ may be a substituted or unsubstituted alkylene, a substituted or unsubstituted alkenylene, a substituted or unsubstituted alkynylene group, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, $R^b$ and $R^c$ may independently be the same or different and are hydrogen, a C1 to C20 alkyl, a C2 to C20 alkenyl, a C2 to C20 alkynyl, a C3 to C20 cycloalkyl, or a C6 to C18 aryl, n is an integer ranging from 1 to 3, x, y, and z indicate a mole number of each repeating unit, wherein x and y are an integer of greater than 0, and z is an integer of 0 or greater.

The Chemical Formula 4 may be represented by Chemical Formula 8 or Chemical Formula 9.

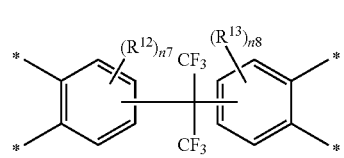

Chemical Formula 8

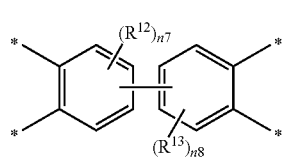

Chemical Formula 9

In the Chemical Formula 8 and Chemical Formula 9, $R^{12}$, $R^{13}$, n7, and n8 are the same as defined in the Chemical Formula 4.

In the Chemical Formula 5, $R^{11}$ may be selected from groups of chemical formulae.

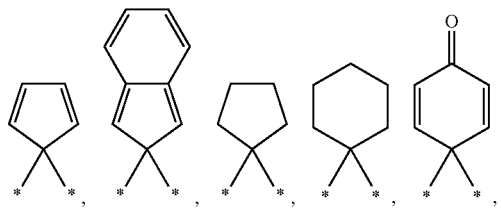

-continued

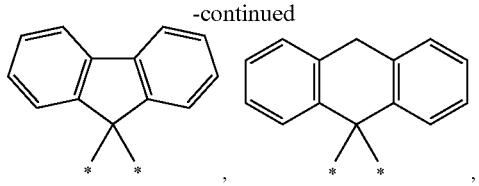

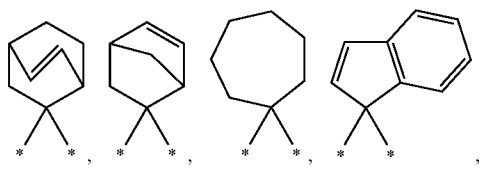

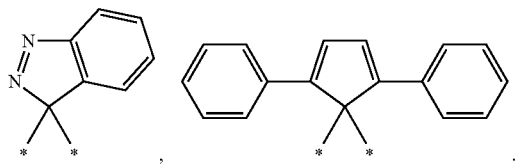

In the Chemical Formula 6,
R$^6$ and R$^7$ are the same or different and are independently —CF$_3$, —CCl$_3$, —CBr$_3$, —Cl$_3$, —NO$_2$, —CN, —COCH$_3$, or —CO$_2$C$_2$H$_5$.

R$^1$ of the Chemical Formula 1 may be the same or different in each repeating unit, and may be independently selected from chemical formulae.

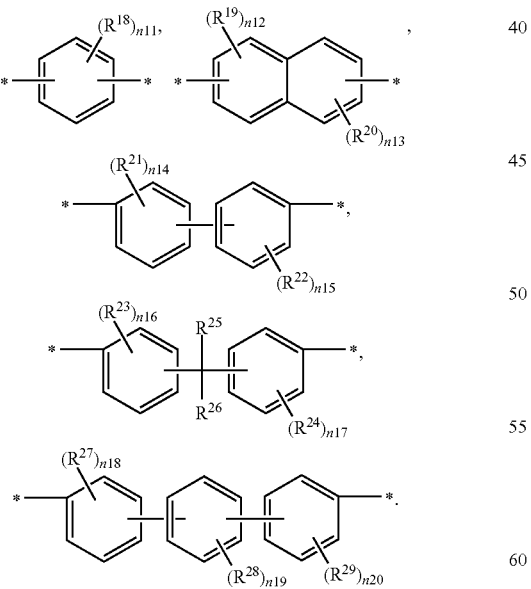

In the chemical formulae,
R$^{18}$ to R$^{29}$ are the same or different and are independently a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

R$^1$ may be selected from the group of chemical formulae.

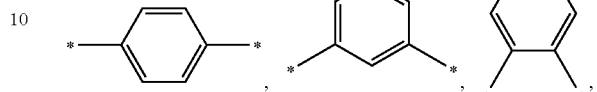

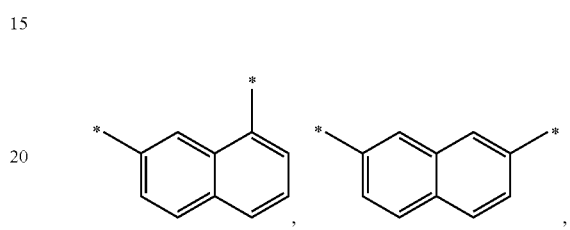

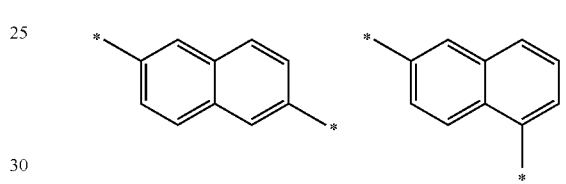

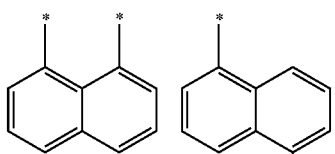

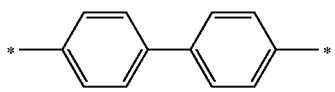

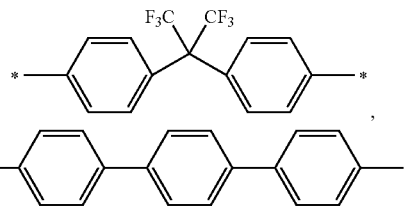

In the Chemical Formula 1, a mole ratio of the x to y may be about 99 to 1:about 1 to 99.

In the Chemical Formula 1, when z is not 0, a mole ratio of (x+y) to z may be about 5 to 95:about 95 to 5.

The coating layer may include a cross-linked copolymer represented by Chemical Formula 2, which is a product of curing of the copolymer of the Chemical Formula 1.

Chemical Formula 2

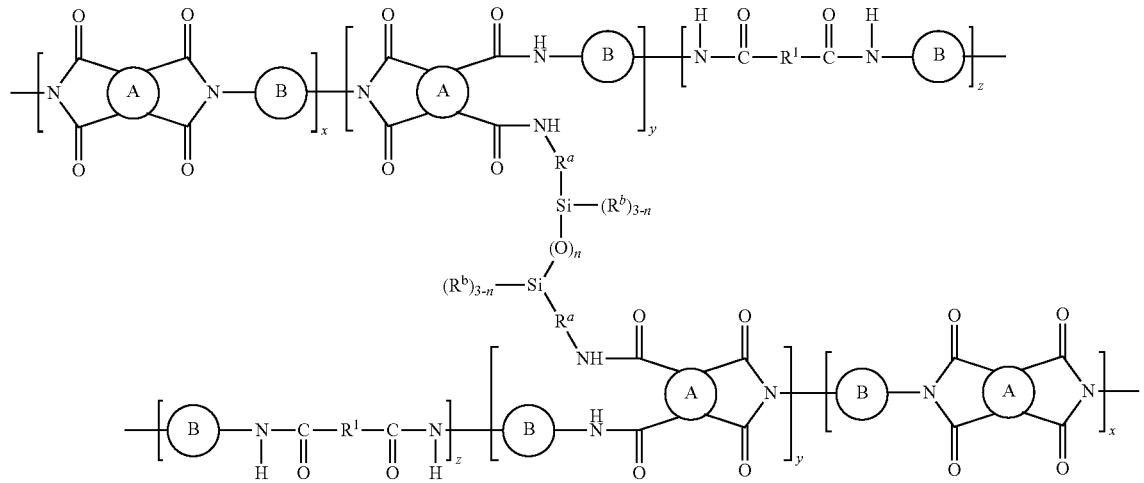

In the Chemical Formula 2,

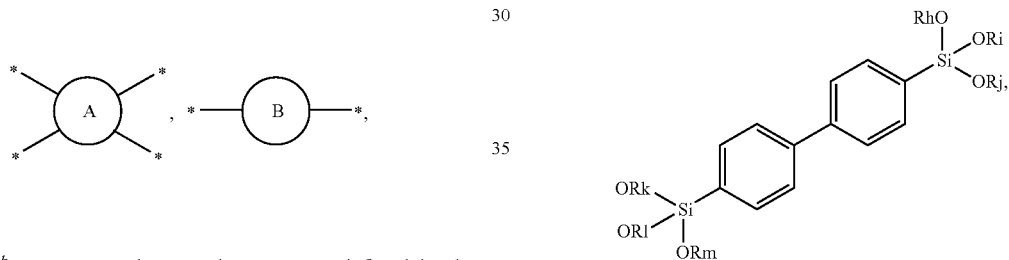

$R^1$, $R^a$, $R^b$, n, x, y, and z are the same as defined in the Chemical Formula 1.

The coating layer may further include an inorganic particle or a precursor thereof.

The inorganic particle may include an oxide or hydroxide of at least one element selected from Ti, Si, Al, Zr, Sn, B, and Ce.

The inorganic particle may be $SiO_2$ or $TiO_2$.

The precursor of the inorganic particle may be at least one selected from tetraethyl orthosilicate, tetramethyl orthosilicate, titanium tetraisopropoxide, and compounds represented by Chemical Formulae 10 to 12.

Chemical Formula 10

In the Chemical Formula 10, $R^b$ and $R^c$ may be the same as defined in the Chemical Formula 1, and n may be an integer ranging from 1 to 4.

Chemical Formula 11

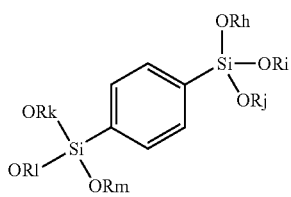

Chemical Formula 12

In the Chemical Formulae 11 and 12,

Rh to Rm are the same or different and are independently a C1 to C20 alkyl, a C2 to C20 alkenyl, a C2 to C20 alkynyl, a C3 to C20 cycloalkyl, or a C6 to C18 aryl.

An amount of the inorganic particle or a precursor of the inorganic particle may be less than or equal to about 90 weight % based on the total weight of the copolymer and the inorganic particle or inorganic particle precursor in the coating layer.

When the coating layer further includes silica or a precursor of the silica as the inorganic particle, the coating layer may further include a cross-linked copolymer structure represented by the following Chemical Formula 3.

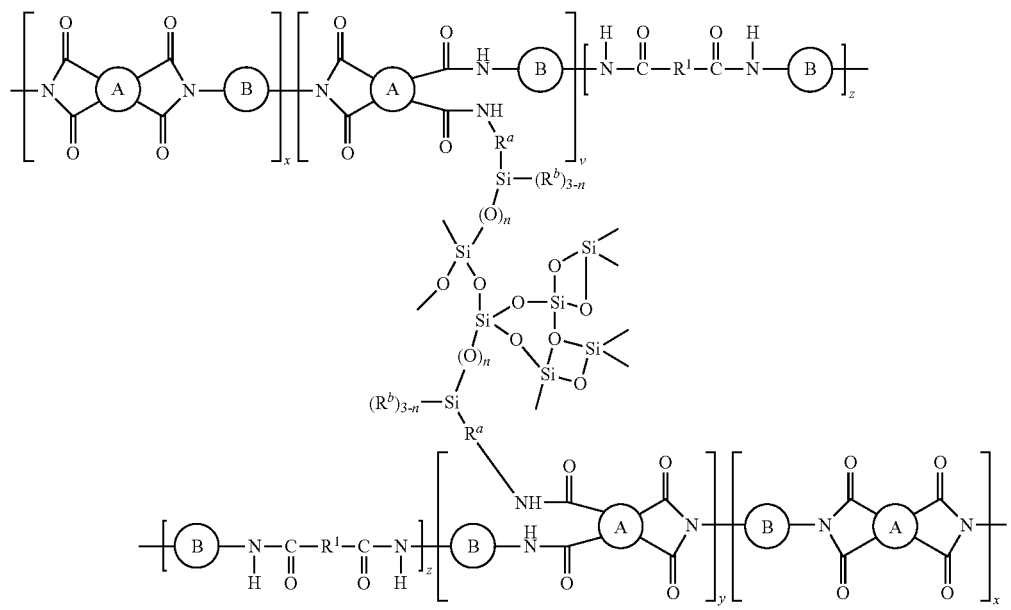

Chemical Formula 3

In the Chemical Formula 3,

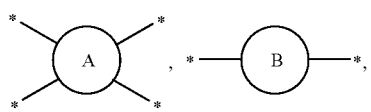

$R^1$, $R^a$, $R^b$, n, x, y, and z are the same as defined in the Chemical Formula 1.

The base film in the composite film may include a copolymer represented by Chemical Formula 13.

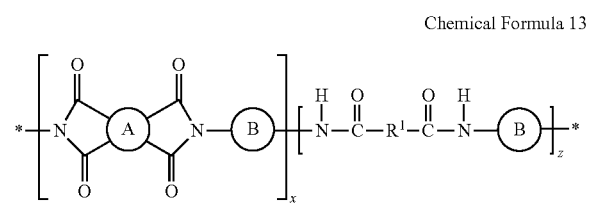

Chemical Formula 13

In the Chemical Formula 13,

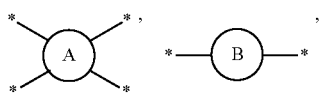

$R^1$, x, and z are independently the same as defined in the Chemical Formula 1.

The base film in the composite film may be about 10 micrometers to about 100 micrometers thick, and the coating layer may be about 0.1 micrometers to about 10 micrometers thick.

The composite film has excellent optical properties, thermal stability, mechanical properties, and chemical resistance.

Another embodiment provides a display device including the composite film.

The display device may be a liquid crystal display device (LCD) or organic light emitting diode (OLED).

DETAILED DESCRIPTION

Figure 1:
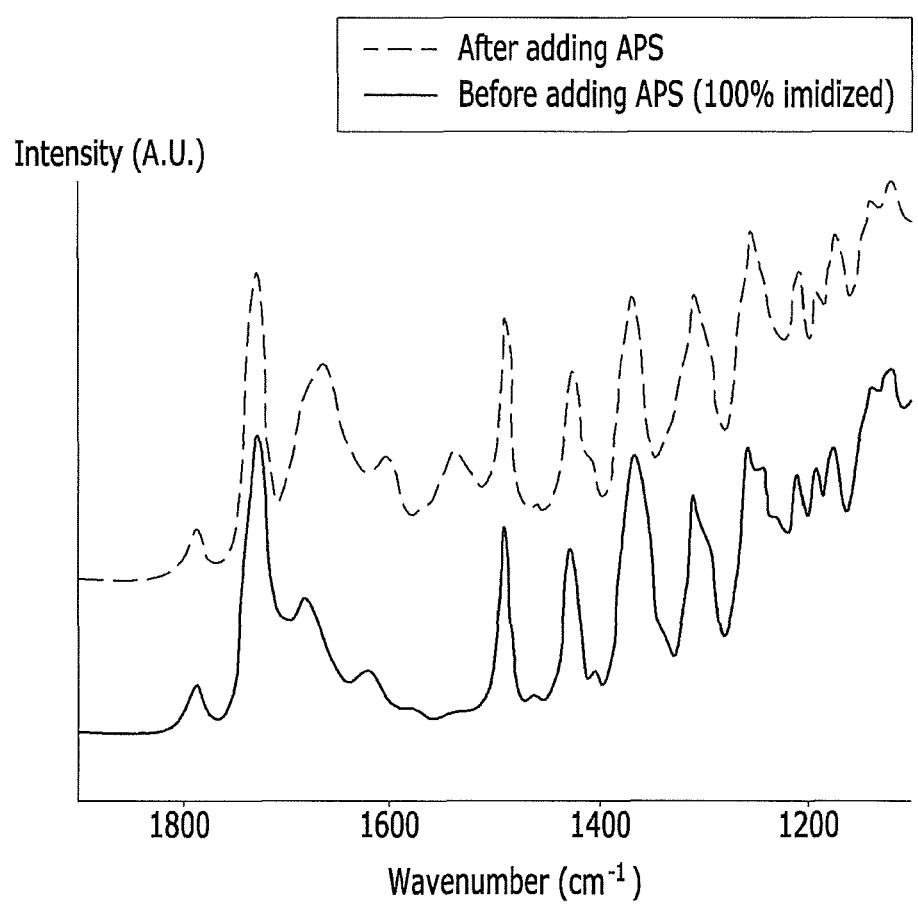
FIG. 1 is a FT-IR graph of intensity (arbitrary units, a. u.) versus wavenumber (reverse centimeters, $cm^{-1}$) showing a silane compound having an amine end introduced into the side chain of a poly(imide-amide) copolymer forming a coating layer in a composite film according to an exemplary embodiment.

Hereinafter, embodiments are described in detail with reference to the accompanying drawings, in which embodiments are shown. However, these embodiments are exemplary, and this disclosure is not limited thereto.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term "substituted" refers to one substituted with at least one substituent including a halogen (—F, —Br, —Cl, or —I), a hydroxyl group, a nitro group, a cyano group, an amino group ($NH_2$, $NH(R^{100})$ or $N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring, instead of at least one hydrogen of a functional group.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "alkenyl group" refers to a straight or branched chain aliphatic hydrocarbon group including at least one double bond, and having the specified number of carbon atoms. Non-limiting examples of the alkenyl group are ethenyl and propenyl.

As used herein, the term "alkynyl group" refers to a straight or branched chain aliphatic hydrocarbon group including at least one triple bond, and having the specified number of carbon atoms. Non-limiting examples of the alkynyl group are ethynyl and propynyl.

As used herein, the term "cycloalkyl group" refers to a monovalent group having one or more saturated rings in which all ring members are carbon and having a specified number of carbon atoms. Non-limiting examples of the cycloalkyl group are cyclopentyl and cyclohexyl.

As used herein, the term "cycloalkenyl group" refers to a monovalent group having one or more rings in which all ring members are carbon, including at least one double bond, and having a specified number of carbon atoms. Non-limiting examples of the cycloalkyl group are cyclopentenyl and cyclohexenyl.

As used herein, the term "cycloalkynyl group" refers to a monovalent group having one or more rings in which all ring members are carbon including at least one triple bond, and having a specified number of carbon atoms. Non-limiting examples of the cycloalkyl group are cyclooctynyl and cyclononynyl.

As used herein, the term "aryl group" refers to an aromatic hydrocarbon containing at least one ring. Non-limiting examples of the aryl group are phenyl, naphthyl, and tetrahydronaphthyl.

As used herein, the term "aralkyl" means a substituted or unsubstituted aryl group covalently linked to an alkyl group that is linked to a compound and having a specified number of carbon atoms. Non-limiting examples of the aralkyl group are benzyl and 2-phenethyl.

As used herein, the terms "alkylene group", "alkenylene group", "alkynelene group", "cycloalkylene group", "cycloalkenylene group", "cycloalkynelene group", "arylene" group", and "aralkylene group" refer to a divalent group respectively derived from an alkyl group, a cycloalkyl group, a heterocycloalkyl group, an aryl group, and a heteroaryl group as defined above.

As used herein, when a definition is not otherwise provide, "electron-withdrawing group" refers to an atom or group that withdraws electron density from a conjugated π system via an inductive or resonance electron effect, thus making the π system more electrophilic.

As used herein, when a specific definition is not otherwise provided, the term "alkyl group" may refer to a C1 to C30 alkyl group, for example a C1 to C15 alkyl group, the term "cycloalkyl group" may refer to a C3 to C30 cycloalkyl group, for example a C3 to C18 cycloalkyl group, the term "alkoxy group" may refer to a C1 to C30 alkoxy group, for example a C1 to C18 alkoxy group, the term "ester group" may refer to a C2 to C30 ester group, for example a C2 to C18 ester group, the term "ketone group" may refer to a C2 to C30 ketone group, for example a C2 to C18 ketone group, the term "aryl group" may refer to a C6 to C30 aryl group, for example a C6 to C18 aryl group, the term "alkenyl group" may refer to a C2 to C30 alkenyl group, for example a C2 to C18 alkenyl group, the term "alkylene group" may refer to a C1 to C30 alkylene group, for example a C1 to C18 alkylene group, and the term "arylene group" may refer to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 aryl group or a C6 to C30 arylene group, for example a C6 to C16 aryl group or a C6 to C16 arylene group, and the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when specific definition is not otherwise provided, the term "combination" refers to mixing or copolymerization.

In addition, in the specification, the mark "*" may refer to a point of connection with the same or different atom or chemical formula.

A poly(imide-amide) film has excellent thermal stability and mechanical characteristics, as well as excellent workability. On the other hand, a polyimide has very high thermal stability but is not dissolved in a solvent when imidized. Thus its coating liquid may be coated in an amic acid state. However, the amic acid is very unstable in a solution due to a reversible reaction and thus is difficult to process.

In addition, an aramid as an amide including an aromatic group has excellent optical properties, readily dissolves in a solvent, and thus has excellent workability but lower thermal characteristics than the polyimide.

Accordingly, these advantages of the polyimide and the aramid are combined to synthesize a transparent polyimide-aramid) having excellent optical properties and thermal stability, as well as easy workability. However, this poly (imide-ara mid) has a drawback that a film formed of the poly(imide-aramid) is easily damaged by an organic solvent despite having excellent workability. In other words, the film lacks chemical resistance.

A transparent polyimide or poly(imide-amide) material has good transparency and thermal stability, excellent mechanical strength and flexibility, and the like, and thus may be used as a display substrate material. However, it still requires excellent chemical resistance, since a substrate for a display needs to be washed and etched.

In an embodiment, a composite film including a base film including a polyimide or polyimide-amide) copolymer and a coating layer including a copolymer represented by the following Chemical Formula 1 on a surface of the base film is provided.

Chemical Formula 1

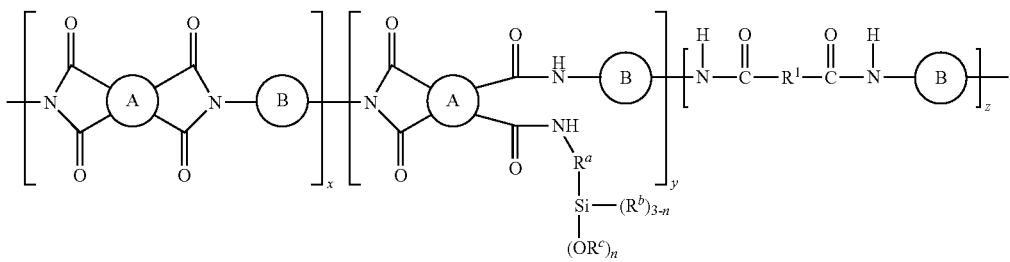

In the above Chemical Formula 1,

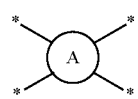

is the same or different in each repeating unit, and is independently represented by the following Chemical Formula 4.

Chemical Formula 4

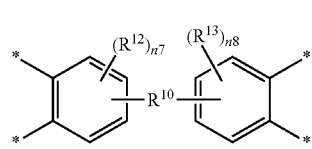

In the above Chemical Formula 4, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxy group, an alkoxy group of formula —$OR^{208}$, wherein $R^{208}$ is a C1 to C10 aliphatic organic group, a silyl group of formula —$SiR^{209}R^{210}R^{211}$, wherein $R^{209}$, $R^{210}$, and $R^{211}$ are the same or different and are independently hydrogen or a C1 to C10 aliphatic organic group, a substituted or unsubstituted C1 to C10 aliphatic organic group, or a C6 to C20 aromatic organic group, and n7 and n8 are independently integers ranging from 0 to 3.

In the above Chemical Formula 1, the

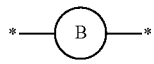

is the same or different in each repeating unit, and is independently represented by the following Chemical Formula 5, 6, or 7.

Chemical Formula 5

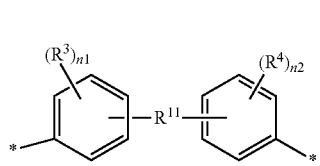

In the above Chemical Formula 5, $R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and are independently a halogen, a hydroxy group, an alkoxy group of formula —$OR^{200}$, wherein $R^{200}$ is a C1 to C10 aliphatic organic group, a silyl group of formula —$SiR^{201}R^{202}R^{203}$, wherein $R^{201}$, $R^{202}$, and $R^{203}$ are the same or different and are independently hydrogen or a C1 to C10 aliphatic organic group, a substituted or unsubstituted C1 to C10 aliphatic organic group, or a C6 to C20 aromatic organic group, and n1 and n2 are independently integers ranging from 0 to 4.

Chemical Formula 6

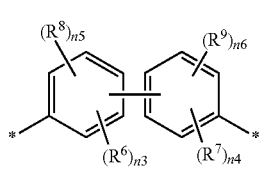

In the above Chemical Formula 6, $R^6$ and $R^7$ are the same or different and are independently an electron withdrawing group, $R^8$ and $R^9$ are the same or different and are independently a halogen, a hydroxy group, an alkoxy group of formula —$OR^{204}$, wherein $R^{204}$ is a C1 to C10 aliphatic organic group, a silyl group of formula —$SiR^{205}R^{206}R^{207}$, wherein $R^{205}$, $R^{206}$, and $R^{207}$ are the same or different and are independently hydrogen or a C1 to C10 aliphatic organic group, a substituted or unsubstituted C1 to C10 aliphatic organic group, or a C6 to C20 aromatic organic group, n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3, and
provided that n4+n6 is an integer ranging from 1 to 4.

Chemical Formula 7

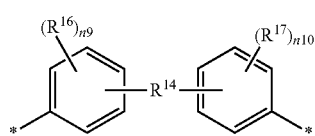

In the above Chemical Formula 7, $R^{14}$ is O, S, C(=O), CH(OH), S(=O)$_2$, Si(CH$_3$)$_2$, (CH$_2$)$_p$, wherein $1 \leq p \leq 10$, (CF$_2$)$_q$, wherein $1 \leq p \leq 10$, C(CH$_3$)$_2$, C(CF$_3$)$_2$, C(=O)NH, or a substituted or unsubstituted C6 to C30 aromatic organic group, wherein the aromatic organic group includes one aromatic ring, 2 or more aromatic rings linked together to provide a condensed ring, or 2 or more aromatic rings linked together through a single bond, or a functional group of a fluorenylene group, O, S, C(=O), CH(OH), S(=O)$_2$, Si(CH$_3$)$_2$, (CH$_2$)$_p$, wherein $1 \leq p \leq 10$, (CF$_2$)$_q$, wherein $1 \leq p \leq 10$, C(CH$_3$)$_2$, C(CF$_3$)$_2$, or C(=O)NH, $R^{16}$ and $R^{17}$ are the same or different and are independently halogen, a hydroxy group, an alkoxy group of formula —$OR^{212}$, wherein $R^{212}$ is a C1 to C10 aliphatic organic group), a silyl group of formula —$SiR^{213}R^{214}R^{215}$, wherein $R^{213}$, $R^{214}$, and $R^{215}$ are the same or different or are independently hydrogen or a C1 to C10 aliphatic organic group, a substituted or unsubstituted C1 to C10 aliphatic organic group, or a C6 to C20 aromatic organic group, and n9 and n10 are integers ranging from 0 to 4.

In the above Chemical Formula 1, $R^1$ may be the same or different in each repeating unit, and may independently be a substituted or unsubstituted C6 to C30 aromatic organic group.

In the above Chemical Formula 1, $R^a$ may be a substituted or unsubstituted alkylene, a substituted or unsubstituted alkenylene, a substituted or unsubstituted alkenylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, $R^b$ and $R^c$ may independently be the same or different and are hydrogen, a C1 to C20 alkyl, a C2 to C20 alkenyl, a C2 to C20 alkynyl, a C3 to C20 cycloalkyl, or a C6 to C18 aryl, n is an integer ranging from 1 to 3, x, y, and z indicate a mole number of each repeating unit, x and y are an integer of greater than 0, and z is an integer of 0 or greater.

The above Chemical Formula 4 may be represented by the following Chemical Formula 8 or the following Chemical Formula 9.

Chemical Formula 8

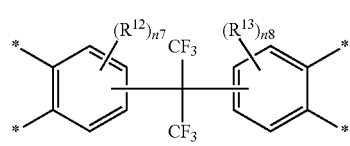

-continued

Chemical Formula 9

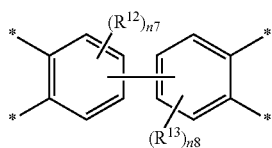

In the above Chemical Formula 8 and Chemical Formula 9, $R^{12}$, $R^{13}$, n7, and n8 are the same as defined in the above Chemical Formula 4.

In the above Chemical Formula 5, $R^{11}$ may be selected from groups of the following chemical formulae.

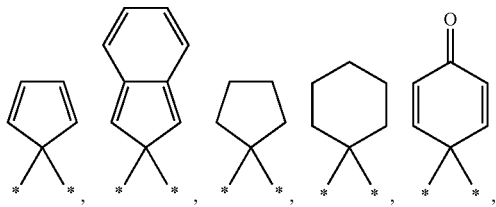

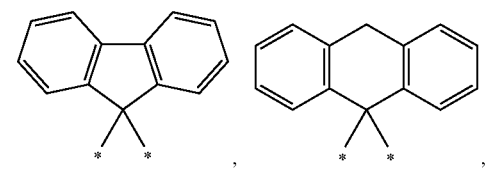

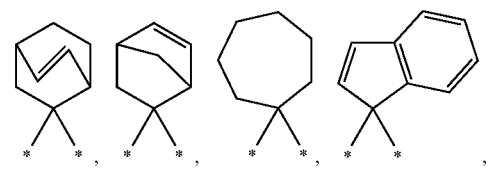

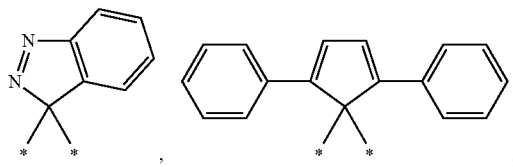

In the above Chemical Formula 6, $R^6$ and $R^7$ are the same or different and are independently —$CF_3$, —$CCl_3$, —$CBr_3$, —$Cl_3$, —$NO_2$, —$CN$, —$COCH_3$, or —$CO_2C_2H_5$.

$R^1$ of the above Chemical Formula 1 may be the same or different in each repeating unit, and is independently selected from the following chemical formulae.

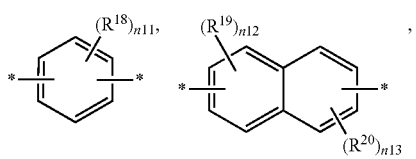
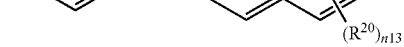

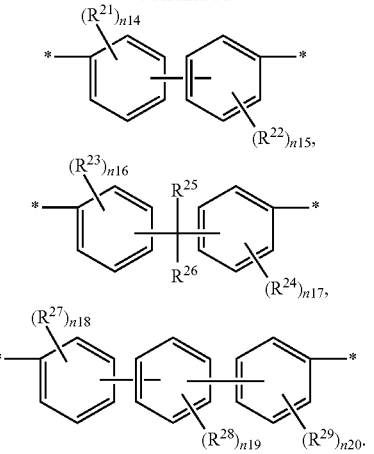

In the above chemical formulae, $R^{18}$ to $R^{29}$ are the same or different and are independently a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

$R^1$ may be selected from the group of the following chemical formulae.

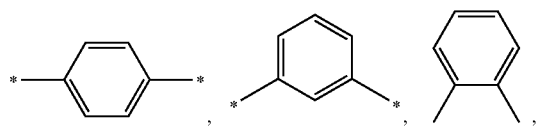

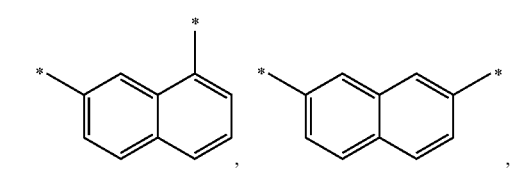

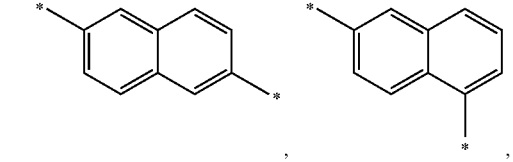

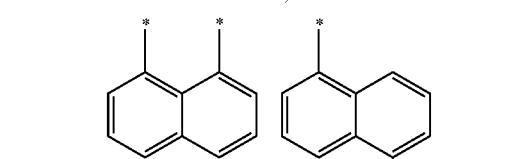

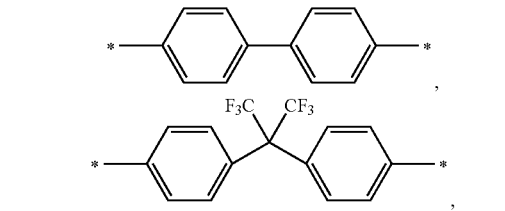

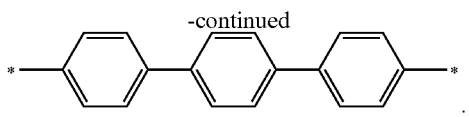

In an exemplary embodiment,

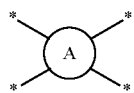

of the above Chemical Formula 1 may be represented by the above Chemical Formula 8 or Chemical Formula 9 (wherein n7 and n8 are 0),

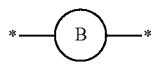

may be represented by the above Chemical Formula 6 or Chemical Formula 7 (wherein n5, n6, n9, and n10 are 0, $R^6$ and $R^7$ are —$CF_3$, and $R^{14}$ is $SO_2$), and $R^1$ is represented by the following chemical formula.

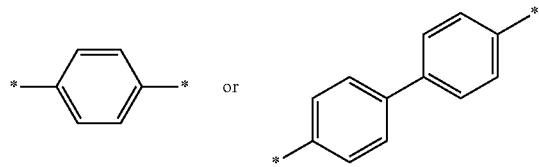

In an exemplary embodiment,

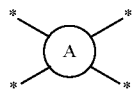

of the above Chemical Formula 1 is represented by the above Chemical Formula 8, wherein n7 and n8 are 0, and

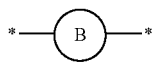

is represented by the above Chemical Formula 6, wherein n5 and n6 are 0, wherein $R^6$ and $R^7$ are —$CF_3$, and z in the above Chemical Formula 1 is 0.

In an exemplary embodiment, $R^a$ of the above Chemical Formula 1 may be a propylene group, n may be 0, and $R^c$ may be a methyl group.

In the above Chemical Formula 1, when z is 0, the copolymer includes a silane compound having an amine end introduced into the side chain of a poly(imide-amic acid) copolymer.

In the above Chemical Formula 1, when z is not 0, the copolymer shows a silane compound having an amine end introduced into the side chain of a poly{(imide-amic acid)-(amide)} copolymer.

In the above Chemical Formula 1, a mole ratio of x to y may be about 99 to 1 to about 1 to 99.

In the above Chemical Formula 1, when z is not 0, a mole ratio of (x+y) to z may be ranging from about 5 to 95 to about 95 to 5.

The copolymer of the above Chemical Formula 1 may be manufactured by reacting a carboxylic acid group of an amic acid repeating unit of a conventional poly(imide-amic acid) copolymer or a carboxylic acid group formed by opening a ring of a part of an imide repeating unit with an amine end of a silane compound to form an amide bond.

For example, according to the following exemplary embodiment, the polyimide is prepared by reacting 6FDA (2,2-bis-(3,4-dicarboxylphenyl)hexafluoropropane dianhydride) and TFDB (2,2'-bis(trifluoromethyl)benzidine), to which 3-aminopropyl-triethoxysilane (APS) is added, so that an amino group of the APS compound may react with a carboxylic acid group formed by opening a part of a ring of the polyimide and thus form an amide ring. Before and after the reaction, FT-IR (Fourier transform infrared) spectroscopy is used to measure a specimen, and the results are provided in FIG. 1. As shown in FIG. 1, a product after the reaction shows two different peaks from a polyimide copolymer before adding the APS thereto. Particularly, in FIG. 1, one peak shown at 1536 $cm^{-1}$ indicates a N—H bond, while the other peak shown at 1684 $cm^{-1}$ indicates a C=O bond of an amide, and accordingly, these results show that the carboxyl group formed by opening an imide ring of the polyimide forms an amide bond with an amine group of the APS, and the silane compound is introduced into the side chain of the polyimide copolymer.

Accordingly, the copolymer of the above Chemical Formula 1 may be manufactured by mixing and reacting the silane compound having an amine end with the polyimide or poly(imide-amide) copolymer.

The polyimide may be prepared by reacting a diamine with a dianhydride. Accordingly, an appropriate diamine and dianhydride may be selected out of conventional diamines and dianhydrides to prepare a polyimide having a desired structure by a person having ordinary skill in a related art. In addition, a poly(imide-amide) may be manufactured by using a monomer for the polyimide to manufacture a polyimide block, and then mixing and reacting the polyimide block with a polyamide block. The polyamide may be manufactured by reacting a diamine with a dicarboxylic acid derivative.

The silane compound having the amino terminal end may be represented by the following Chemical Formula 14.

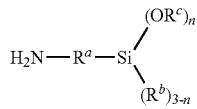

Chemical Formula 14

In the above Chemical Formula 14, $R^a$, $R^b$, $R^c$, and n are the same as defined in the above Chemical Formula 1.

A coating composition including the copolymer of the above Chemical Formula 1 may be coated on a base film including a polyimide or poly(imide-amide) copolymer to form a composite film having a coating layer including a polyimide or a poly(imide-amide) copolymer into which a silane compound having an amine end is introduced at a side chain.

When the coating layer is coated and cured on the base film, the copolymer of Chemical Formula 1 in the coating layer may be converted into a cross-linked copolymer represented by the following Chemical Formula 2.

Chemical Formula 2

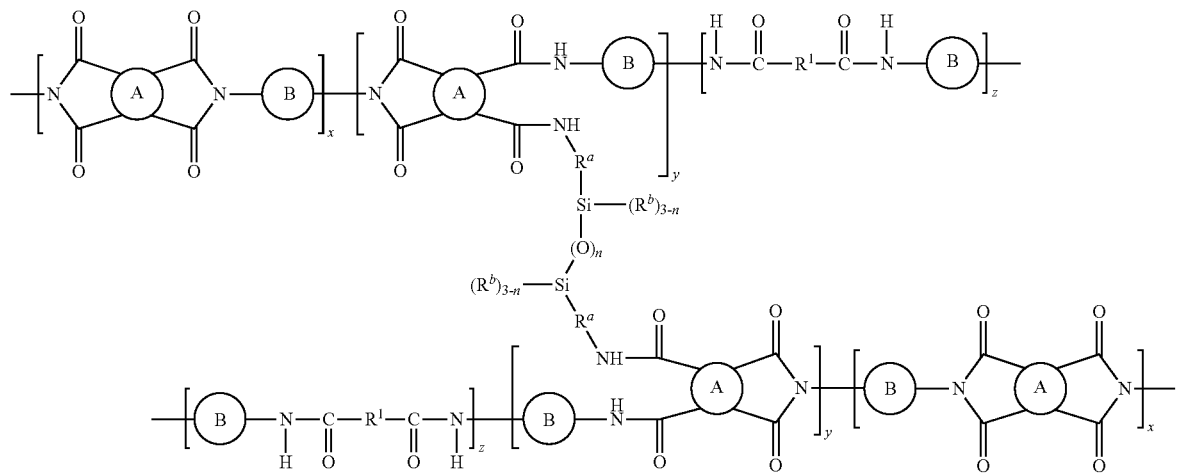

In the above Chemical Formula 2,

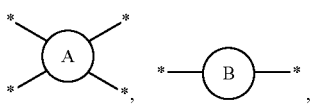

$R^1$, $R^a$, $R^b$, n, x, y, and z are the same as defined in the above Chemical Formula 1.

Accordingly, the composite film includes a base film including a polyimide or poly(imide-amide) copolymer and a coating layer including a copolymer represented by the following Chemical Formula 2 disposed on one surface of the base film.

The coating layer may further include an inorganic particle or a precursor thereof.

The inorganic particle may include an oxide or hydroxide of at least one element selected from Ti, Si, Al, Zr, Sn, B, and Ce.

The inorganic particle may include silica ($SiO_2$) or titania ($TiO_2$).

The precursor of the inorganic particle may be at least one selected from TEOS (tetraethyl orthosilicate), TMOS (tetramethyl orthosilicate), TTIP (titanium tetraisopropoxide), and compounds represented by the following Chemical Formulae 10 to 12.

Chemical Formula 10

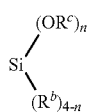

In the above Chemical Formula 10, $R^b$ and $R^c$ are the same as $R^b$ and $R^c$ of in the above Chemical Formula 1, and n is an integer ranging from 1 to 4.

Chemical Formula 11

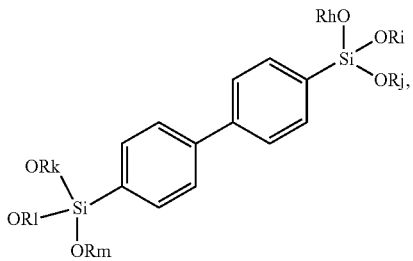

Chemical Formula 12

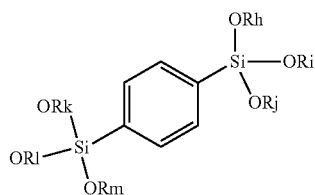

In the above Chemical Formulae 11 and 12,

Rh to Rm are the same or different, and are independently a C1 to C20 alkyl, a C2 to C20 alkenyl, a C2 to C20 alkynyl, a C3 to C20 cycloalkyl, or a C6 to C18 aryl.

The inorganic particle or a precursor of the inorganic particle may be sufficiently included to provide the inorganic particle in an amount of less than or equal to about 90 percent by weight (weight %) based on the total weight of the copolymer and the inorganic particle or inorganic particle precursor in the coating layer.

The inorganic particle or the precursor of the inorganic particle may be mixed and reacted with a coating composition including the copolymer of the above Chemical Formula 1, and thus form a cross-linking structure represented by the following Chemical Formula 3 in a coating layer, and may be included among the copolymers of the above Chemical Formula 1.

Chemical Formula 3

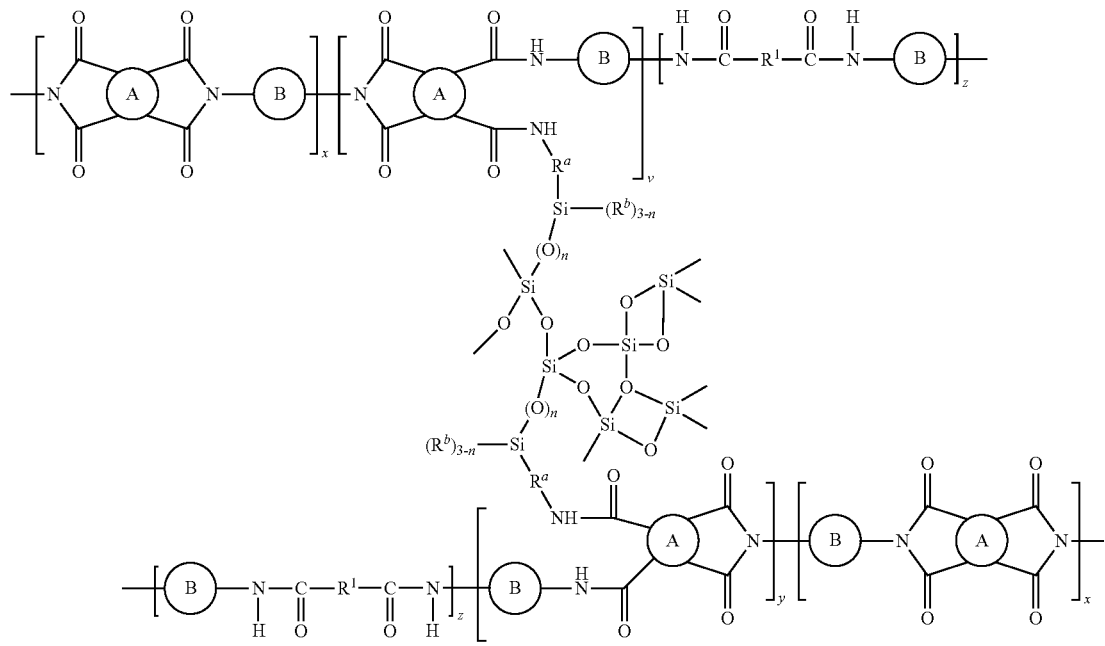

In the above Chemical Formula 3,

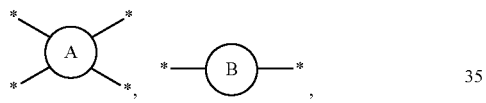

$R^1$, $R^a$, $R^b$, n, x, y, and z are the same as defined in the above Chemical Formula 1. As shown in the above Chemical Formula 3, the inorganic particle or the precursor of the inorganic particle forms additional cross-linking among the silane compounds introduced into the side chain of the copolymer of the above Chemical Formula 1. As shown in the following examples, the inorganic particle or the precursor of the inorganic particle forms a cross-linking bond among silane compounds introduced into the side chain of the above Chemical Formula 1, and brings about more cross-linking bonds among the copolymers of Chemical Formula 1 compared with the case that the inorganic particle or the precursor thereof is not included. Accordingly, when the inorganic particle or the precursor of the inorganic particle is included, a repeating unit marked as y in the copolymer of the above Chemical Formula 1, that is, the amount of a repeating unit into which a silane compound having an amine end is introduced, may be decreased, and optical properties of a composite film may be further improved. The copolymer of the above Chemical Formula 1 tends to deteriorate optical properties, since a yellow index (YI) and haze (Hz) increase, as the amount of the amine group is increased, by introducing the silane compound having an amine end into the side chain. However, when the inorganic particle or the precursor of the inorganic particle is included, the copolymers may be well cross-linked even though the amount of the silane compound having an amine end is decreased in the copolymer of the above Chemical Formula 1, and thus a composite film having a coating layer formed of the copolymer may have excellent mechanical strength, chemical resistance, and thermal stability while still further improving optical properties. On the other hand, a base film in the composite film may include a polyimide or poly(imide-amide) copolymer represented by the following Chemical Formula 13.

Chemical Formula 13

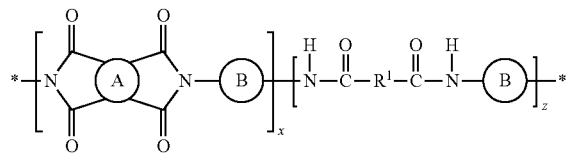

In the above Chemical Formula 13,

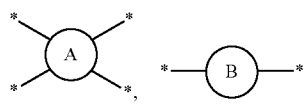

$R^1$, x, and z are the same as defined in the above Chemical Formula 1. The polyimide or poly(imide-amide) copolymer of the above Chemical Formula 13 has colorless and transparent optical properties and excellent thermal stability, heat resistance, chemical resistance, and mechanical properties, and may be used for a display device and the like. However, the base film is not limited to the polyimide or poly(imide-amide) copolymer of the above Chemical Formula 13, and may be formed of any various well-known polyimide or poly(imide-amide) copolymers depending on a desired purpose by a person having ordinary skill in a related art to manufacture a composite film according to the embodiment.

Figure 2:
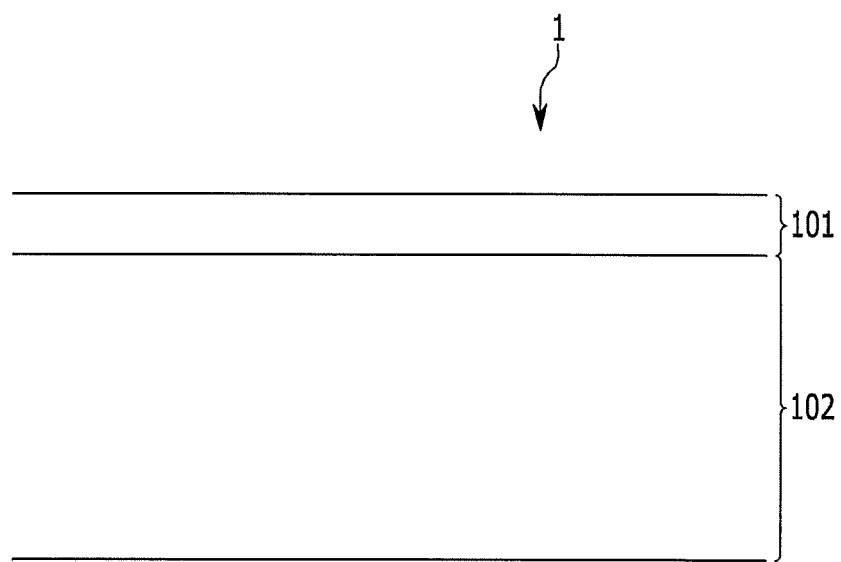
FIG. 2 is a schematic view showing the cross-section of a composite film 1 in which a coating layer 101 including a copolymer represented by Chemical Formula 1 is formed on one surface of a base film 102 according to an exemplary embodiment.
Figure 3:
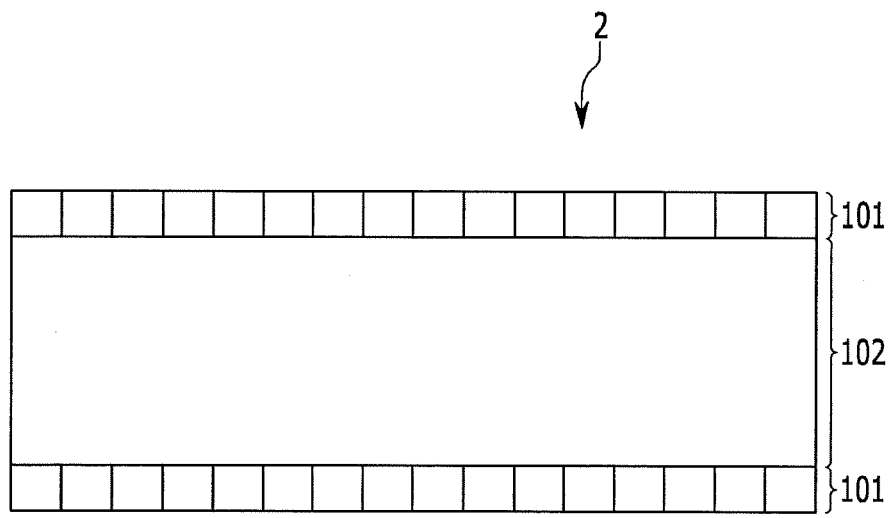
FIG. 3 is a schematic view showing the cross-section of a composite film 2 in which the coating layer 101 including the copolymer represented by Chemical Formula 1 is formed on both sides of the base film 102 according to an exemplary embodiment.

The cross-section of the composite film according to an exemplary embodiment is shown in FIGS. 2 and 3.

In FIG. 2, a composite film 1 includes a coating layer 101 including the copolymer of the above Chemical Formula 1 on one surface of a base film 102 including a polyimide or poly(imide-amide) copolymer.

FIG. 3 shows a composite film 2 having the coating layer 101 including the copolymer of the above Chemical Formula 1 on both surfaces of the base film 102.

In the composite film, the base film 101 may have a thickness of about 10 micrometers (μm) to about 100 μm, for example about 40 μm to about 100 μm, and the coating layer 102 may have a thickness of about 0.1 μm to about 10 μm, for example about 1 μm to about 7 μm.

The composite film has excellent optical properties and thermal characteristics, chemical resistance, and mechanical properties.

For example, the film may have light transmittance of greater than or equal to about 80% at a wavelength of about 400 nanometers (nm) to about 750 nm.

For example, the film may have light transmittance of greater than or equal to about 60% at a wavelength of about 430 nm.

The film has a coefficient of thermal expansion (CTE) of less than or equal to about 50 parts per million per degree Centigrade (ppm/° C.) and a temperature of greater than or equal to about 400° C. at which the film is degraded by about 0.1%.

The film shows no exterior appearance change such as cloudiness and the like even when dipped in a solvent such as acetone, PRS-2000, and the like at room temperature for about 10 minutes, and no weight change due to absorption of the solvent.

Accordingly, another embodiment provides a display device including the composite film having excellent optical properties, thermal stability, mechanical properties, and chemical resistance.

The display device may include a liquid crystal display (LCD), an organic light emitting diode (OLED), and the like, but is not limited thereto.

Figure 4:
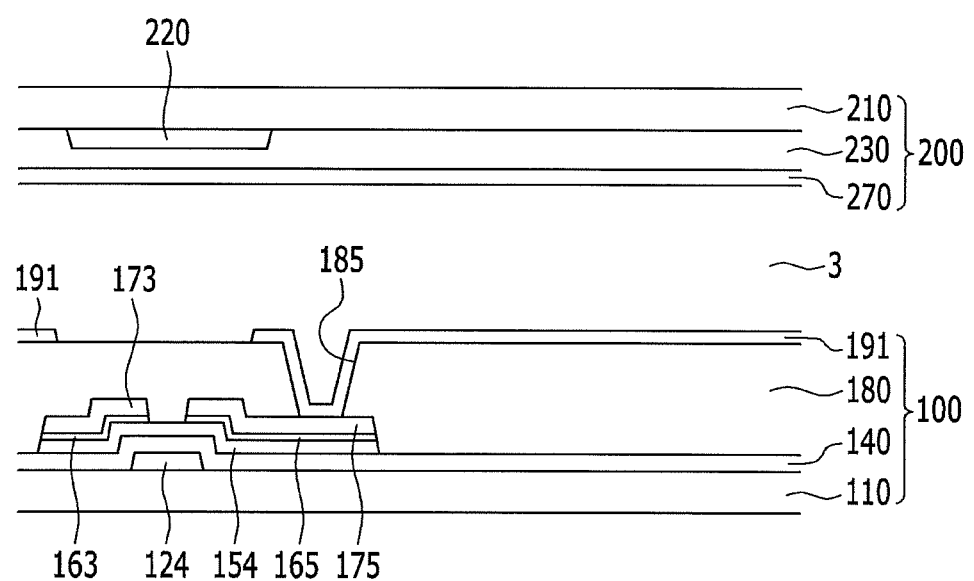
FIG. 4 is a cross-sectional view showing a liquid crystal device (LCD) according to an embodiment.

Among the display devices, a liquid crystal display ("LCD") is described in FIG. 1. FIG. 4 is a cross-sectional view of a liquid crystal display ("LCD") in accordance with an embodiment.

Referring to FIG. 4, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described.

In the common electrode panel 200, a light blocking member 220 referred to as a black matrix is disposed on a substrate 210, a color filter 230 is disposed on the substrate 210 and the light blocking member 220, and a common electrode 270 is formed on the color filter 230.

Herein, the substrates 110 and 210 may include the composite including the poly(amide-imide) block copolymer and inorganic particles.

Figure 5:
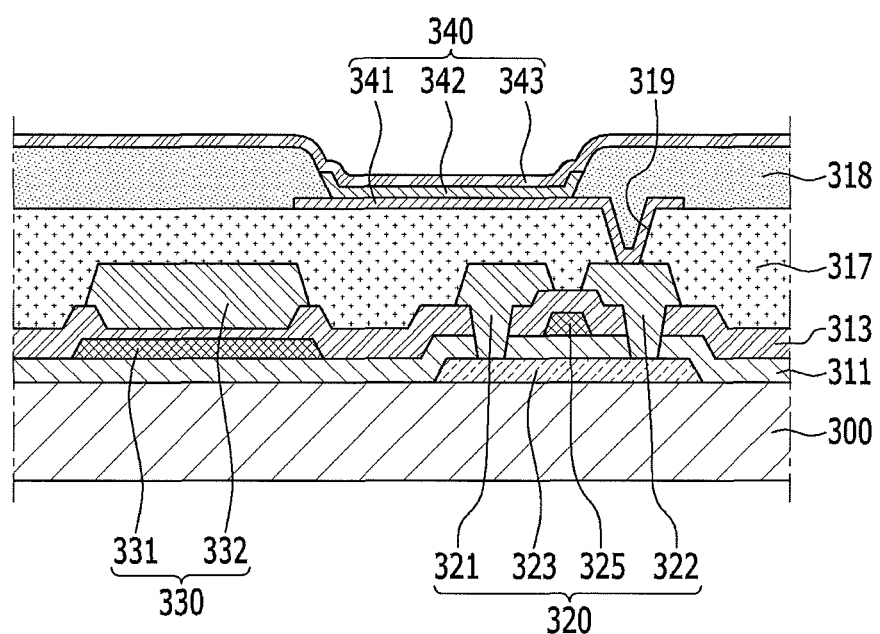
FIG. 5 is a cross-sectional view showing an organic light emitting diode (OLED) according to an embodiment.

Among the display devices, an organic light emitting diode (OLED) is described by referring to FIG. 5. FIG. 5 is a cross-sectional view showing an organic light emitting diode (OLED) in accordance with an embodiment.

Referring to FIG. 5, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Hereafter, this disclosure is described in detail with reference to examples. The following examples and comparative examples are not restrictive but are illustrative.

EXAMPLE

Model Experiment: Reactivity of Imide Ring and Amino Silane

6FDA and TFDB are used to prepare a polyimide, and 3-aminopropyl-triethoxysilane (APS) is added thereto for a reaction in order to ensure that an imide ring is open, and a carbonyl group derived from the imide ring is connected to an amino group of the amino silane compound (APS). After the reaction, FT-IR measurement results of a product are determined and are provided in FIG. 1, and as shown in FIG. 1, the product after the reaction shows two peaks differing from the polyimide before adding the APS. In FIG. 1, a peak shown at 1536 $cm^{-1}$ indicates an N—H bond of an amide, while another peak shown at 1684 cm$^{-1}$ indicates a C=O bond of an amide, and thus the imide ring of the polyimide is open and forms an amide bond with the amino silane (APS).

Synthesis Example 1: Preparation of Poly(imide-amide)

Oligoamic Acid (Prepolymer A):
372.35 g (1.5 mol) of DADPS (4,4'-diaminodiphenyl sulfone) is dissolved in 1,000 g of DMAc in a 3 L double-walled reactor equipped with a mechanical agitator and a nitrogen inlet at 20° C. under a nitrogen atmosphere. 444.25 g (1 mol) of 6-FDA and 224.9 g of DMAc are added thereto. The mixture is reacted at 20° C. for 24 hours, obtaining an amic acid oligomer solution (40 weight %). The oligomer solution is refrigerated and stored.

Amide Block (Prepolymer B):
2.3831 g (0.0096 mol) of DADPS and 3.0742 g (0.0096 mol) of TFDB are charged in a 250 mL four-necked double walled reactor equipped with a mechanical agitator and a nitrogen inlet, and 78 ml (73.233 g) of DMAc is added thereto. The diamine solution is stirred until the monomers are completely dissolved, and the solution is cooled down under a nitrogen atmosphere (a temperature of a cooling system is set to 5° C.). Subsequently, 2.6797 g (0.0096 mol) of biphenyl acid dichloride (BPCl) is added to the reaction mixture in four steps over about 30 minutes. The temperature of the cooling system is increased up to 10° C. Subsequently, the solution is stirred for one hour more, obtaining a prepolymer B.

Synthesis of Block Copolymer:
6.533 g. of the prepolymer A and 81 ml (75.731 g) of DMAc are added to the prepolymer B solution, and the mixture is cooled down (the temperature of a cooling system is set to 5° C.). 2.2739 g (0.0112 mol) of terephthalic acid chloride (TPCl) is added thereto through four steps. The temperature of the cooling system is increased up to 10° C., and the cooled reactant is reacted for one hour more.

Chemical Imidization:
The temperature is increased up to 20° C., and 1.3067 g (0.0128 mol) of acetic anhydride is added thereto. After stirring the mixture for 30 minutes, 4.303 g (0.0544 mol) of pyridine is added thereto, and the resulting mixture is reacted for 12 hours more.

Synthesis Example 2: Preparation of Poly(imide-amic acid)

8.0058 g (0.025 mol) of TFDB is charged in a 250 mL double-walled reactor equipped with a mechanical agitator and a nitrogen inlet, and dissolved in 70 ml of NMP therein. Subsequently, 11.106 g (0.025 mol) of 6-FDA and 28 ml of NMP are added thereto. The mixture is then reacted at 20° C. under a nitrogen atmosphere for 48 hours.

Chemical Imidization:
3.75 ml of acetic anhydride and 3.24 ml of pyridine are added to the obtained amic acid oligomer, and imidization to 80% is processed. The reaction mixture is agitated at 20° C. for 24 hours under a nitrogen atmosphere.

Precipitation:
The chemically imidized solution is poured in to methanol to obtain white fibers. A polymer produced therein is filtered and washed with methanol, and then ground with a blender and dried in a 60° C. vacuum oven over one night, obtaining an oligomer of an 80%-imidized poly(imide-amic acid) copolymer.

Examples 1 to 7 and Comparative Examples 1 and 2: Preparation of Coating Composition Each coating composition is prepared by using the oligomer of the poly(imide-amide) according to Synthesis Example 1 (Examples 5 to 7) or the oligomer of the poly(imide-amic acid) according to Synthesis Example 2 (Examples 1 to 4) as a basic copolymer, and introducing 3-aminopropyl)-triethoxysilane (APS) into the side chain of the copolymer in an amount shown in the following Table 1. In addition, TMOS (tetramethyl orthosilicate) as a silica precursor is added to some compositions (Examples 2 to 7) in an amount provided in the following Table 1.

On the other hand, a composite film according to Comparative Example 1 is manufactured by coating a coating solution including no copolymer according to Synthesis Example 1 or 2 but only a silane compound of APS having an amino terminal end on a base film. In addition, a composite film according to Comparative Example 2 is manufactured by coating a coating liquid including no APS of the silane compound or a silica precursor of TMOS, but only using the poly(imide-amic acid) according to Synthesis Example 2 on a base film and curing it. The APS is added before adding the TMOS and water. All the compositions are aged for about one hour before being coated on a base film.

TABLE 1

| | Polymer solution for coating (g)$^{a)}$ | r-APS (g) | TMOS (g) | H$_2$O/DMAc (g)$^{b)}$ |
|---|---|---|---|---|
| Example 1 | 3 | 2.5783 | 0.0000 | 0.7875 |
| Example 2 | 3 | 0.4736 | 0.0844 | 0.1946 |
| Example 3 | 3 | 0.4736 | 0.1900 | 0.2571 |
| Example 4 | 3 | 0.4736 | 0.7600 | 0.5946 |
| Example 5 | 3 | 0.4736 | 0.0844 | 0.1946 |
| Example 6 | 3 | 0.4736 | 0.1900 | 0.2571 |
| Example 7 | 3 | 0.4736 | 0.3257 | 0.3375 |
| Comparative Example 1 | — | 1.0000 | 0.0000 | 0.0000 |
| Comparative Example 2 | 3 | 0.0000 | 0.0000 | 0.0000 |

$^{a)}$a solid content: 10 weight % in a polymer solution
$^{b)}$H$_2$O/DMAc (weight %) = 40/60

Preparation Example: Coating and Drying Film

Manufacture of Base Film
A poly(imide-amide) copolymer according to Synthesis Example 1 is coated on a glass substrate by using a doctor blade. The coating is dried and cured in the following process.

All the films are predried at 80° C. for 1 hour, and moved to a furnace and heat-treated at 300° C. for 1 hour under a nitrogen atmosphere by increasing the temperature at a rate of 10° C./min.

The dried and cured base films are about 35 μm thick. The film thickness is measured within ±1 μm by using a micrometer (Mitutoyo Co.).

Manufacture of Coating Layer
The coating compositions according to Examples 1 to 7 and Comparative Examples 1 and 2 are respectively spin-coated on both sides of a base film (a thickness of about 35 μm) at a shear ratio of 1500 revolutions per minutes (rpm), and then dried and cured, manufacturing each composite film.

The drying and curing are performed as follows.
Each film is predried at 80° C. for 1 hour and then moved to a furnace under a nitrogen atmosphere and heated for about 15 minutes by increasing the temperature at a rate of 10° C./min up to 300° C.

The coating layer formed on one surface of the base film is about 3 µm to 3.5 µm thick. The film thickness is measured at ±1 µm by using a Mitutoyo micrometer (Mitutoyo Co.).

Evaluation
Evaluation Method
Chemical Resistance

The chemical resistance of the films is evaluated by respectively dipping the films in an acetone solution and PRS2000 for 10 minutes at room temperature, and then measuring weight change of the films and examining their exterior appearance change.

Optical Properties

The optical properties of the films are measured by using a "Konica Minolta CM3600d" spectrophotometer with a transmittance opacity/haze mode.

Coefficient of Thermal Expansion and Glass Transition Temperature

A coefficient of thermal expansion (CTE) is measured by using TMA Q400 (TA Instruments, USA) according to the following heating program. As for a measurement value, the second scan value is used, and the measurement is performed in temperature ranges of 50° C. to 150° C., 50° C. to 250° C., and 50° C. to 300° C.

First Scan Condition: maintain the same temperature for 5 minutes→heat up to 300° C. at a rate of 5° C./min→cool down to 40° C.

Second Scan Condition: heat up to 400° C. at a rate of 5° C./min

Thermogravimetric Analysis: TGA

A thermogravimetric analysis (TGA) is performed on about 10 to 15 mg of a sample in $Al_2O_3$ heated from 25° C. to 600° C. at a rate of 10° C./min under a nitrogen atmosphere (gas flow rate: 70 mL/min) by using a TGA Q800 thermogravimetric analyzer (TA Instruments, USA). A polymer decomposition temperature (Td) is measured as a temperature at which a weight decreases by 0.1%, 1%, and 5%.

Results

The chemical resistance and optical properties of the manufactured composite films are measured, and the results are provided in the following Table 2 and Table 3.

TABLE 2

| | Acetone | | PRS2000 | |
|---|---|---|---|---|
| | Weight changes, % | Appearance changes | Weight changes, % | Appearance changes |
| Example 1 | 0.6 | None | 0.5 | None |
| Example 2 | 3.0 | None | 0.0 | None |
| Example 3 | 2.3 | None | 0.3 | None |
| Example 4 | 1.9 | None | 0.6 | None |
| Example 5 | 2.5 | Good | 0.2 | None |
| Example 6 | 3.4 | Good | 0.0 | None |
| Example 7 | 2.3 | Good | 0.0 | None |
| Comparative Example 1 | 25.2 | swollen | 0.2 | None |
| Comparative Example 2 | 23.4 | swollen | 19.8 | swollen and cloudy |

As shown in Table 2, the composite films respectively including the coating layer according to the embodiment show no exterior appearance change and almost no weight change when dipped in acetone or PRS2000 for 10 minutes at room temperature.

On the other hand, the composite film manufactured by coating a silane compound of APS having an amino terminal end on a base film according to Comparative Example 1 and the composite film manufactured by using no APS but only poly(imide-amic acid) according to Comparative Example 2 show considerable weight change due to swelling caused by a solvent when dipped in acetone or PRS2000 for 10 minutes, and also appear swollen and/or cloudy when externally examined.

TABLE 3

| Sample code | Tr | YI | Haze | 400 nm | 430 nm |
|---|---|---|---|---|---|
| Example 2 | 90.91 | 4.44 | 0.79 | 74.47 | 83.47 |
| Example 3 | 90.71 | 1.12 | 0.36 | 83.21 | 88.71 |
| Example 4 | 90.86 | 0.85 | 0.58 | 83.56 | 88.89 |
| Example 5 | 86.61 | 7.8 | 5.04 | 62.35 | 74.08 |
| Example 6 | 87.35 | 5.4 | 2.4 | 70.02 | 78.95 |
| Example 7 | 89.77 | 3.2 | 1.2 | 79.86 | 85.2 |
| Comparative Example 1 | 90.51 | 2.81 | 1.79 | 81.22 | 86.53 |
| Comparative Example 2 | 88.23 | 3.54 | 0.76 | 77.36 | 83.21 |

As shown in Table 3, the composite films according to the embodiment show excellent optical properties.

Further, the composite films according to Examples 1 to 7 show equivalent heat resistance to a conventional film not including the coating layer but including a polyimide or poly(imide-amide) copolymer. For example, the composite films according to Examples 1 to 7 show a coefficient of thermal expansion of about 50 ppm/° C., for example about 40 ppm/° C., and about 30 ppm/° C., within a range of 50° C. to 250° C. In addition, the composite films according to Examples 1 to 7 show a 0.1% weight decrease at greater than or equal to about 350° C., for example greater than or equal to about 370° C., and greater than or equal to about 400° C.

In this way, a composite film according to an embodiment maintains excellent optical properties and heat resistance of a conventional film including a polyimide or poly(imide-amide) copolymer, but shows remarkably improved chemical resistance.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composite film comprising:

a base film comprising a polyimide or poly(imide-amide) copolymer and a coating layer comprising a copolymer represented by Chemical Formula 1 disposed on one surface of the base film:

Chemical Formula 1

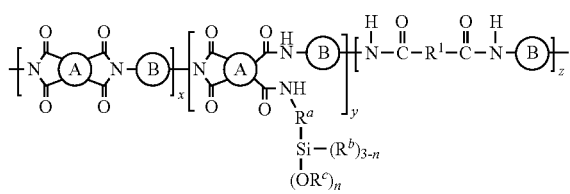

wherein, in the Chemical Formula 1,

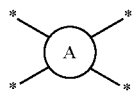

is the same or different in each repeating unit, and is independently represented by Chemical Formula 4:

Chemical Formula 4

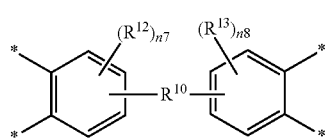

wherein, in the Chemical Formula 4,
$R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group,
$R^{12}$ and $R^{13}$ are the same or different and are independently a halogen, a hydroxy group, an alkoxy group of formula —$OR^{208}$, wherein $R^{208}$ is a C1 to C10 aliphatic organic group, or a silyl group of formula —$SiR^{209}R^{210}R^{211}$, wherein $R^{209}$, $R^{210}$, and $R^{211}$ are the same or different and are independently hydrogen or a C1 to C10 aliphatic organic group, a substituted or unsubstituted C1 to C10 aliphatic organic group, or a C6 to C20 aromatic organic group,
n7 and n8 are independently integers ranging from 0 to 3, and
the

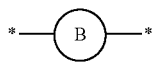

is the same or different in each repeating unit and is independently represented by Chemical Formula 5, 6, or 7:

Chemical Formula 5

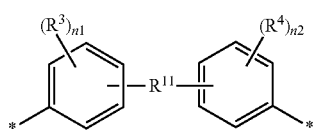

wherein, in the Chemical Formula 5,
$R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group,
$R^3$ and $R^4$ are the same or different and are independently a halogen, a hydroxy group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are independently hydrogen or a C1 to C10 aliphatic organic group, a substituted or unsubstituted C1 to C10 aliphatic organic group, or a C6 to C20 aromatic organic group, and
n1 and n2 are independently integers ranging from 0 to 4, Chemical Formula 6

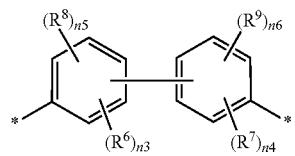

wherein, in the Chemical Formula 6,
$R^6$ and $R^7$ are the same or different and are independently an electron withdrawing group,
$R^8$ and $R^9$ are the same or different and are independently a halogen, a hydroxy group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different and are independently hydrogen or a C1 to C10 aliphatic organic group, a substituted or unsubstituted C1 to C10 aliphatic organic group, or a C6 to C20 aromatic organic group,
n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3, and
provided that n4+n6 is an integer ranging from 1 to 4, Chemical Formula 7

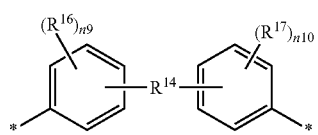

wherein, in the Chemical Formula 7,
$R^{14}$ is O, S, C(=O), CH(OH), S(=O)$_2$, Si(CH$_3$)$_2$, (CH$_2$)$_p$, wherein 1≤p≤10, (CF$_2$)$_q$, wherein 1≤q≤10, C(CH$_3$)$_2$, C(CF$_3$)$_2$, C(=O)NH, or a substituted or unsubstituted C6 to C30 aromatic organic group, wherein the aromatic organic group comprises one aromatic ring; 2 or more aromatic rings linked together to provide a condensed ring; or 2 or more aromatic rings linked together through a single bond, a fluorenylene group, O, S, C(=O), CH(OH), S(=O)$_2$, Si(CH$_3$)$_2$, (CH$_2$)$_p$, wherein 1≤p≤10, (CF$_2$)$_q$, wherein 1≤q≤10), C(CH$_3$)$_2$, C(CF$_3$)$_2$, or C(=O)NH,
$R^{16}$ and $R^{17}$ are the same or different and are independently a halogen, a hydroxy group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different and are independently a hydrogen or a C1 to C10 aliphatic organic group, a substituted or unsubstituted C1 to C10 aliphatic organic group, or a C6 to C20 aromatic organic group,
n9 and n10 are independently an integer ranging from 0 to 4,
$R^1$ is the same or different in each repeating unit, and is independently a substituted or unsubstituted C6 to C30 aromatic organic group, R$^a$ is a substituted or unsubstituted alkylene, a substituted or unsubstituted alkenylene, a substituted or unsubstituted alkynylene group, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, R$^b$ and R$^c$ are the same or different and are independently a hydrogen, a C1 to C20 alkyl, a C2 to C20 alkenyl, a C2 to C20 alkynyl, a C3 to C20 cycloalkyl, or a C6 to C18 aryl, n is an integer ranging from 1 to 3, and x, y, and z indicate a mole number of each repeating unit, wherein x and y are an integer of greater than 0, and z is an integer of 0 or greater.

2. The composite film of claim 1, wherein the Chemical Formula 4 is represented by the Chemical Formula 8 or the Chemical Formula 9:

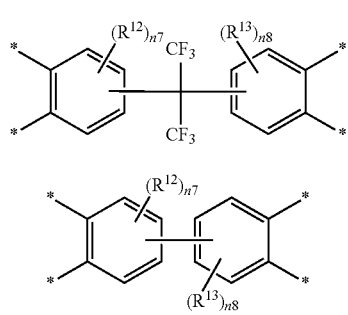

Chemical Formula 8

Chemical Formula 9 wherein, in the Chemical Formula 8 and Chemical Formula 9,

R$^{12}$, R$^{13}$, n7, and n8 are the same as defined in the Chemical Formula 4.

3. The composite film of claim 1, wherein in the Chemical Formula 5, R$^{11}$ is selected from groups of chemical formulae:

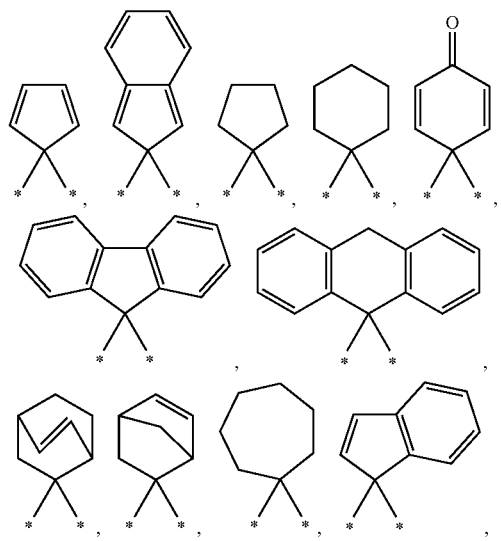

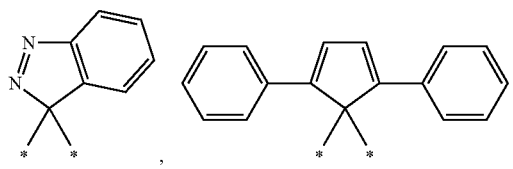

4. The composite film of claim 1, wherein R$^6$ and R$^7$ of the Chemical Formula 6 are the same or different and are independently —CF$_3$, —CCl$_3$, —CBr$_3$, —Cl$_3$, —NO$_2$, —CN, —COCH$_3$, or —CO$_2$C$_2$H$_5$.

5. The composite film of claim 1, wherein R$^1$ of the Chemical Formula 1 is the same or different in each repeating unit, and is independently selected from chemical formulae:

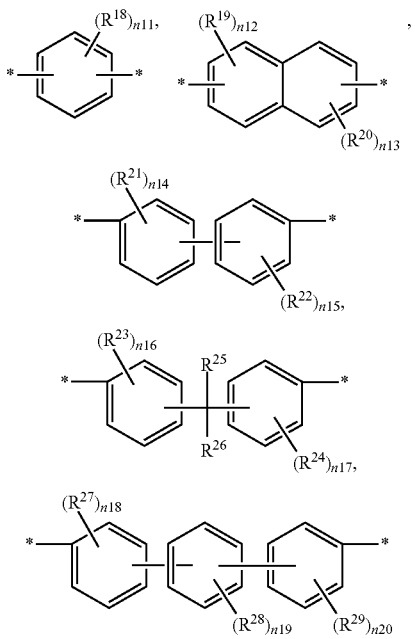

wherein, in the chemical formulae,

R$^{18}$ to R$^{29}$ are the same or different and are independently a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

6. The composite film of claim 1, wherein R$^1$ is selected from the group of chemical formulae:

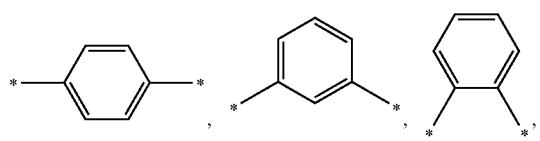

-continued

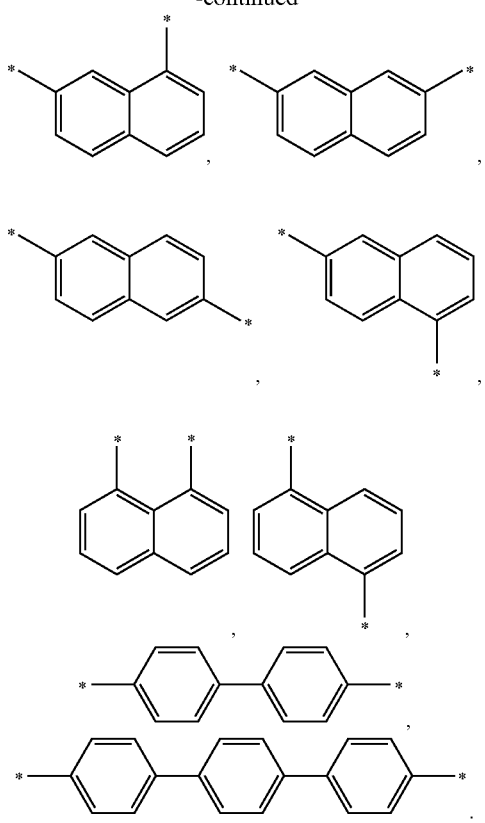

7. The composite film of claim 1, wherein a mole ratio of x to y is about 99 to 1 to about 1 to 99.

8. The composite film of claim 1, wherein in the Chemical Formula 1, when z is not 0, a mole ratio of (x+y) to z is about 5 to 95 to about 95 to 5.

9. The composite film of claim 1, wherein the coating layer comprises a cross-linked copolymer represented by Chemical Formula 2, which is a product of curing of the copolymer of the Chemical Formula 1:

wherein, in the Chemical Formula 2,

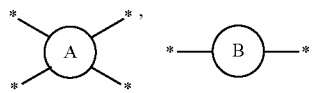

$R^1$, $R^a$, $R^b$, n, x, y, and z are the same as defined in the Chemical Formula 1.

10. The composite film of claim 1, wherein the coating layer further comprises an inorganic particle comprising an oxide or hydroxide of at least one element selected from Ti, Si, Al, Zr, Sn, B, and Ce; or a precursor of the inorganic particle.

11. The composite film of claim 10, wherein the inorganic particle is $SiO_2$ or $TiO_2$.

12. The composite film of claim 10, wherein the precursor of the inorganic particle is at least one selected from tetraethyl orthosilicate, tetramethyl orthosilicate, titanium tetraisopropoxide, and compounds represented by Chemical Formulae 10 to 12:

Chemical Formula 10

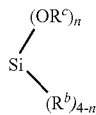

wherein, in the Chemical Formula 10,
$R^b$ and $R^c$ are the same as defined in the Chemical Formula 1, and
n is an integer ranging from 1 to 4, Chemical Formula 11

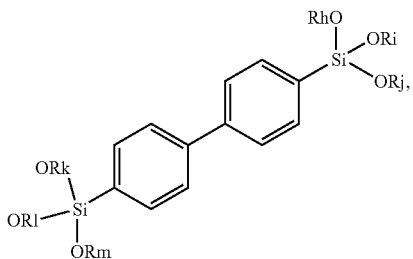

Chemical Formula 2

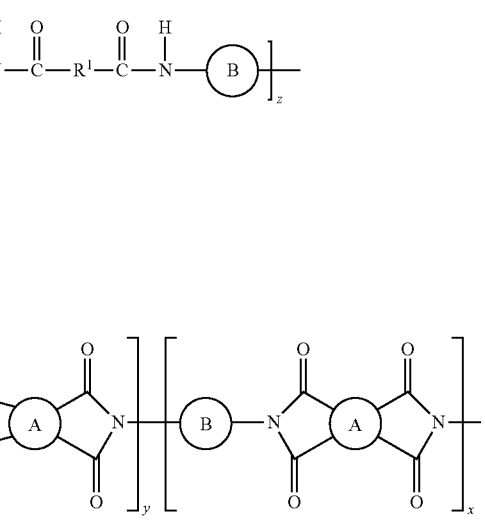

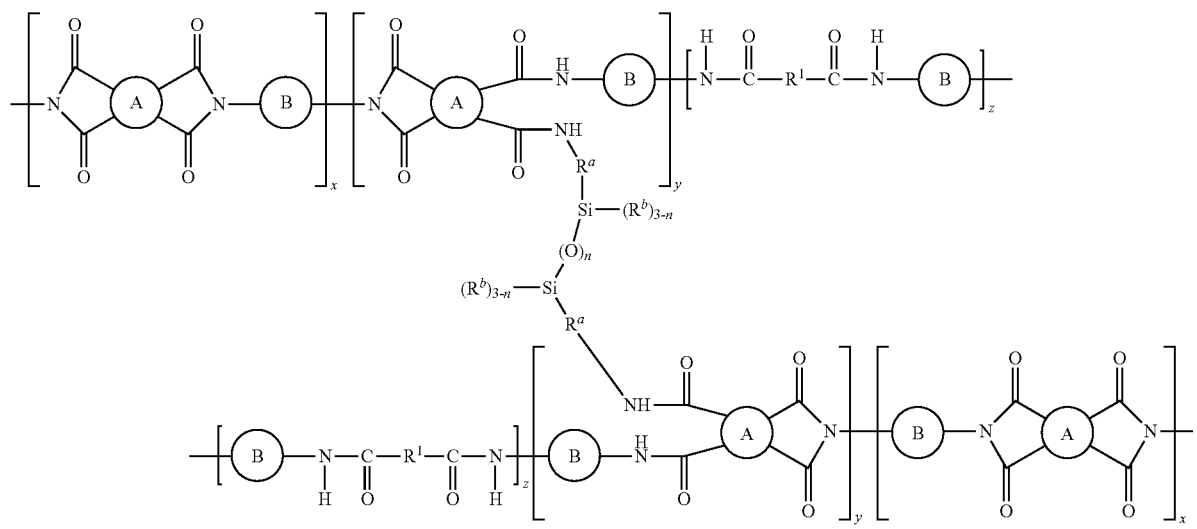

-continued

Chemical Formula 12

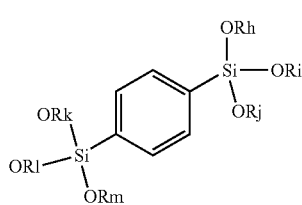

Chemical Formula 13

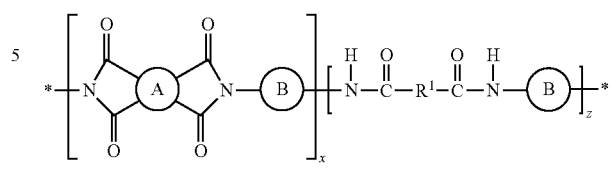

wherein, in the Chemical Formulae 11 and 12,

Rh to Rm are the same or different and are independently a C1 to C20 alkyl, a C2 to C20 alkenyl, a C2 to C20 alkynyl, a C3 to C20 cycloalkyl, or a C6 to C18 aryl.

13. The composite film of claim 10, wherein an amount of the precursor of the inorganic particle or the inorganic particle is less than or equal to about 90 weight % based on the total weight of the copolymer and the inorganic particle or inorganic particle precursor in the coating layer.

14. The composite film of claim 10, wherein when the inorganic particle is silica or a precursor of silica, the coating layer further comprises a cross-linked copolymer represented by Chemical Formula 3:

wherein, in the Chemical Formula 13,

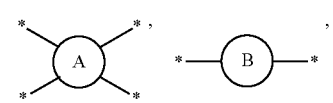

$R^1$, x, and z are independently the same as defined in the Chemical Formula 1.

16. The composite film of claim 1, wherein the base film has a thickness ranging from about 10 micrometers to about 100 micrometers, and the coating layer has a thickness ranging from about 0.1 micrometers to about 10 micrometers.

Chemical Formula 3

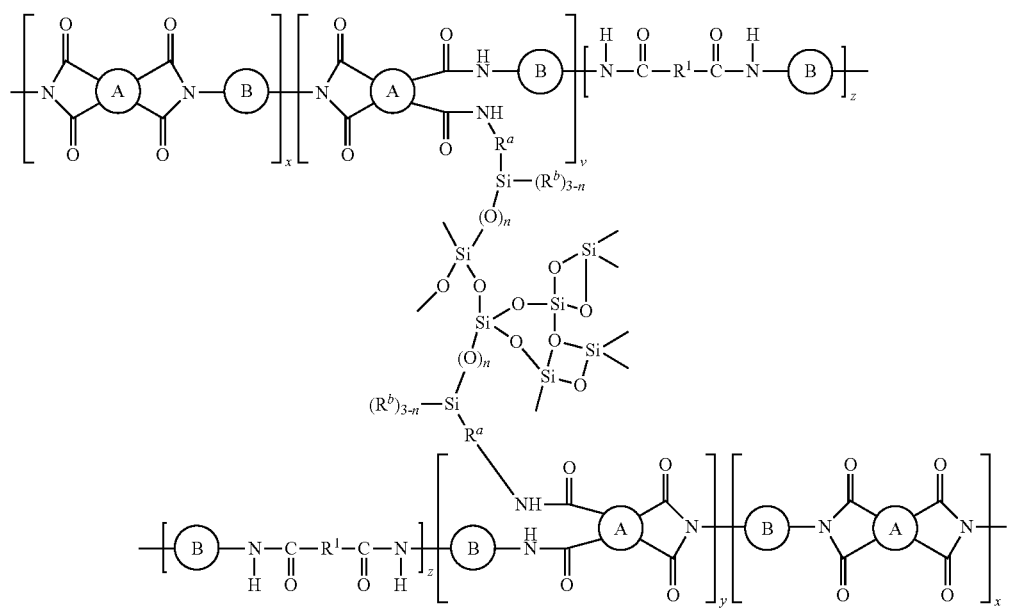

wherein, in the Chemical Formula 3, $R^1$, $R^a$, $R^b$, n, x, y, and z are the same as defined in the Chemical Formula 1.

15. The composite film of claim 1, wherein the base film comprises a copolymer represented by Chemical Formula 13:

17. The composite film of claim 2, wherein

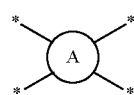

of the Chemical Formula 1 is represented by the Chemical Formula 8 or Chemical Formula 9, wherein n7 and n8 are 0,

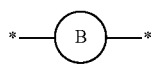

is represented by the Chemical Formula 6 or Chemical Formula 7, wherein n5, n6, n9, and n10 are 0, $R^6$ and $R^7$ are $-CF_3$, and $R^{14}$ is $S(=O)_2$, and $R^1$ is represented by chemical formula:

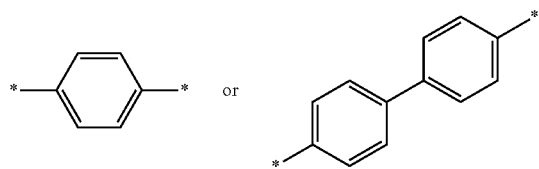 [SMILES: *c1ccc(*)cc1 ; *c1ccc(-c2ccc(*)cc2)cc1]

18. The composite film of claim 17, wherein
$R^a$ of the Chemical Formula 1 is a propylene group,
n is 3, and
$R^c$ is an ethyl group.

19. The composite film of claim 2, wherein

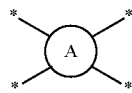

of the Chemical Formula 1 is represented by the Chemical Formula 8, wherein n7 and n8 are 0,

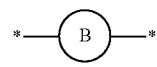

of the Chemical Formula 1 is represented by the Chemical Formula 6, wherein n5 and n6 are 0, and $R^6$ and $R^7$ are $-CF_3$, and z in the Chemical Formula 1 is 0.

20. A display device comprising the composite film of claim 1.

* * * * *